United States Patent
D'Amora

(10) Patent No.: US 6,567,098 B1
(45) Date of Patent: May 20, 2003

(54) METHOD AND APPARATUS IN A DATA PROCESSING SYSTEM FOR FULL SCENE ANTI-ALIASING

(75) Inventor: Bruce David D'Amora, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 481 days.

(21) Appl. No.: 09/599,187

(22) Filed: Jun. 22, 2000

(51) Int. Cl.⁷ .................................................. G09G 5/00
(52) U.S. Cl. ........................ 345/611; 345/660; 345/552
(58) Field of Search ................................ 345/611, 613, 345/660, 669, 670, 671, 552

(56) References Cited

U.S. PATENT DOCUMENTS 5,940,080 A  *  8/1999 Ruehle et al. .............. 345/611
6,317,525 B1 * 11/2001 Aleksic et al. .............. 345/613
6,392,660 B2 *  5/2002 Karjalainen ................. 345/660
6,421,060 B1 *  7/2002 Luken ........................ 345/611

* cited by examiner

Primary Examiner—Matthew Luu
(74) Attorney, Agent, or Firm—Duke W. Yee; Mark E. McBurney

(57) ABSTRACT

A method and apparatus in a data processing system for anti-aliasing an image. The image is rendered to an off screen memory using a size that is larger than a desired size for the image. In the depicted examples, the size is at least two times the desired size. The image is resized within a hardware graphics engine in the data processing system, to the desired size. The image is displayed in the desired size.

28 Claims, 4 Drawing Sheets

```
void display(void)
{
GLint viewport[4];

glGetintegerv (GL_VIEWPORT, viewport);
if(!viewport[3]) return;

glClear(GL_COLOR_BUFFER_BIT | GL_DEPTH_BUFFER_BIT);
Perspective (50.0,
             (GLdouble) viewport[2]/(GLdouble) viewport[3],
             1.0, 15.0, j8[0].x, j8[0].y,
             0.0, 0.0, 1.0);
displayObjects ();
//load texture memory
glCopyTexImage2D(GL_TEXTURE_2D, 0,
             GL_RGB,
             0,0,
             512, 512,
             o);
glClear(GL_COLOR_BUFFER_BIT | GL_DEPTH_BUFFER_BIT);
//set state
glDisable(GL_LIGHTING);
glDisable(GL_DEPTH);
glEnable(GL_TEXTURE 2D);
glMatrixMode(GL_PROJECTION);
glPushMatrix();
glLoadidentity();
glOrtho(0.0, 512.0, 0.0, 512.0, -1.0, 1.0);
glMatrixMode(GL_MODELVIEW);
glPushMatrix();
glLoadidentity();
// draw mapped GL_QUAD
glBegin(GL_QUADS);
glTexCoord2f(0.0, 0.0);
glVertex2f(0.0, 0.0);
glTexCoord2f(0.0, 1.0);
glVertex2f(0.0, 256.0);
glTexCoord2f(1.0, 1.0);
glVertex2f(256.0, 256.0);
glTexCoord2f(1.0, 0.0);
glVertex2f(256.0, 0.0);
glEnd();

glutSwapBuffers();

//reset state
glPopMatrix();
glMatrixMode(GL_PROJECTION);
glPopMatrix();
glEnable(GL_LIGHTING);
glDisable(GL_TEXTURE_2D);
gl_Enable(GL_DEPTH);
}
```

FIG. 7

METHOD AND APPARATUS IN A DATA PROCESSING SYSTEM FOR FULL SCENE ANTI-ALIASING

BACKGROUND OF THE INVENTION

1. Technical Field

The present invention relates generally to an improved data processing system and in particular, to a method and apparatus for processing graphics data. Still more particularly, the present invention provides a method and apparatus for full scene anti-aliasing of 3D graphics data.

2. Description of Related Art

Data processing systems, such as personal computers and workstations, are commonly utilized to run a variety of 3D graphics applications including CAD/CAM, CAE, and Digital Content Creation (DCC). Engineers, scientists, technicians, and others employ these applications daily. These applications involve complex calculations, such as finite element analysis, to model stress in structures. Other applications include chemical or molecular modeling applications. CAD/CAM/CASE applications are normally graphics intensive in terms of the number of small primitives—points, lines, triangles—processed by the graphics adapter or subsystem. DCC applications are used to create a variety of 3D graphics images some requiring a high degree of photorealism. Generally, users of these applications require and demand that the data processing systems be able to provide extremely fast graphics information and extremely good image quality.

The processing of a graphics data stream to provide a graphical display on a video display terminal requires an extremely fast graphics system to provide a display with a rapid response and a very high resolution graphics frame buffer. This insures that there are enough pixels samples to display lines/edges in a smooth fashion rather than a stairstepped jagged look. In these types of graphics systems, primitives are received for processing and display. A primitive is a graphics element that is used as a building block for creating images, such as, for example, a point, a line, or a triangle. A primitive is defined by a group of one or more vertices. An attribute is used to define how a primitive will be displayed. Attributes include, for example, line style, color, and surface texture. A vertex defines a point, an end point of an edge, or a corner of a polygon where two edges meet. Data also is associated with a vertex in which the data includes information, such as positional coordinates, colors, normals, and texture coordinates. Commands are sent to the graphics system to define how the primitives and other data should be processed for display.

When displaying primitives, one common problem is that jagged edges may be present. This effect is also referred to as "jaggies" or "staircasing" and results from an all or nothing approach to scan conversion in which each pixel is either replaced with the primitive's color or left unchanged. This staircasing is an instance of a phenomenon known as aliasing. The application of techniques to reduce or eliminate aliasing as referred to as anti-aliasing. Such functions for anti-aliasing may be provided on a graphics adapter. Currently, however, this type of support requires specific hardware for functions, such as super sampling, multisampling, and accumulating data. Providing anti-aliasing functions, such as full scene anti-aliasing (FSAA), increases the complexity and cost of graphics adapters.

Therefore, it would be advantageous to have an improved method and apparatus for providing FSAA without increasing the complexity or cost of a graphics adapter via the addition of redundant logic units in the graphics chip(s).

SUMMARY OF THE INVENTION

The present invention provides a method and apparatus in a data processing system for anti-aliasing an image. The image is rendered to an off screen memory using a size that is larger than a desired size for the image. In the depicted examples, the size is at least two times the desired size. The image is resized within a hardware graphics engine in the data processing system, to the desired size. The image is displayed in the desired size.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 7 is a diagram illustrating code for an FSAA function in accordance with a preferred embodiment of the present invention.

DETAILED DESCRIPTION OF THE PREFERRED EMBODIMENT

Figure 1:
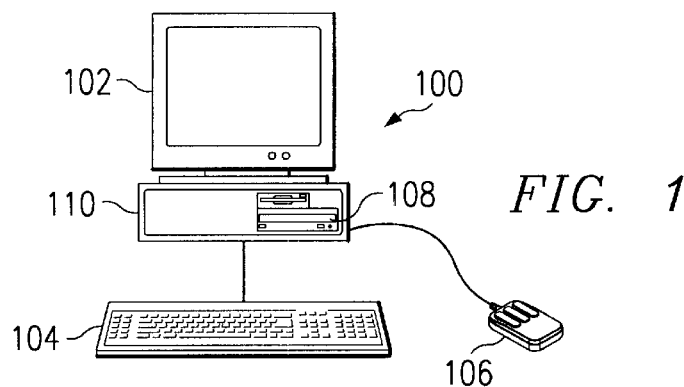
FIG. 1 is a pictorial representation of a data processing system in which the present invention may be implemented in accordance with a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted, which includes a system unit 110, a video display terminal 102, a keyboard 104, storage devices 108, which may include floppy drives and other types of permanent and removable storage media, and mouse 106. Additional input devices may be included with personal computer 100, such as, for example, a joystick, touchpad, touch screen, trackball, microphone, and the like. Computer 100 can be implemented using any suitable computer (PC or workstation), such as an IBM RS/6000 computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface that may be implemented by means of software residing in computer readable media in operation within computer 100.

Figure 2:
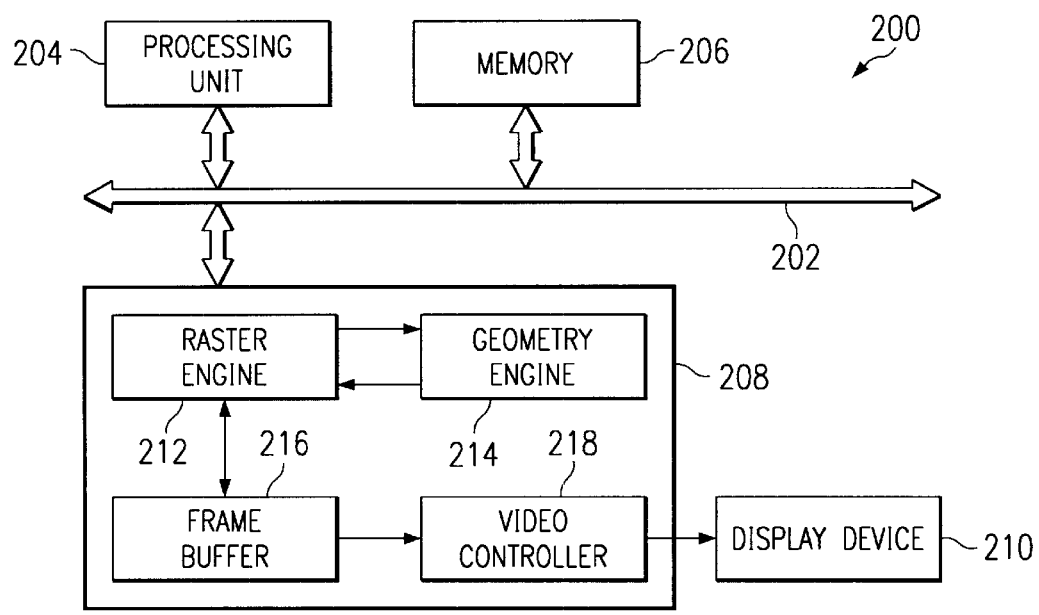
FIG. 2 is a block diagram of a data processing system in accordance with a preferred embodiment of the present invention.

Turning next to FIG. 2, a block diagram of a data processing system is depicted in accordance with a preferred embodiment of the present invention. Data processing system 200 is an example of components used in a data processing system, such as computer 100 in FIG. 1. Data processing system 200 employs a bus 202 in the form of a peripheral component interconnect (PCI) local bus architecture. Although the depicted example employs a PCI bus, other bus architectures, such as Accelerated Graphics Port (AGP) and Industry Standard Architecture (ISA), may be used. Processing unit 204, memory 206, and graphics adapter 208 are connected to bus 202 in these examples. Processing unit 204 includes one or more microprocessors in the depicted example.

Graphics adapter 208, in this example, processes graphics data for display on display device 210. The graphics data is received from applications executed by processing unit 204. Graphics adapter 208 includes a raster engine 212, a geometry engine 214, a frame buffer 216, and a video controller 218. Raster engine 212 receives the graphics data from the application. Depending on whether the data represents an image or geometry, the raster engine processes directly or transfers to geometry engine for processing. In these examples, raster engine 212 contains the hardware and/or software used to rasterize an image for display. Raster engine 212 is used to turn text and images into a matrix of pixels to form a bitmap for display on a screen. In the depicted example, raster engine 212 sends the received graphics data to geometry engine 214, which provides the functions for processing primitives and other graphics data to generate a set of vertices in screen coordinates and color intensity at each vertex for raster engine 212 to process. The processed data is then passed back to raster engine 212. The mechanisms of the present invention are located in geometry engine 214 in these examples.

Frame buffer 216 is an area of memory used to hold a frame of picture elements (pixels) that include 32-bit r,g,b,a color values, 24-bit z depth, and 8-bit stencil values. Frame buffer 216 is typically used for screen display and is the size of the maximum image area on the screen. Frame buffer 216 forms a separate memory bank on graphics adapter 208 to hold the pixels for a frame. When the rasterizer has finished adding all the pixels to the frame, the video controller (RAMDAC) 218 takes the digital pixel data in frame buffer 216, converts to an analogy signal, and generates a display on display device 210. Typically, video controller 218 will cycle through frame buffer 216 one scan line at a time.

The present invention recognizes that FSAA functionality in a graphics engine creates redundancy of function in today's graphics adapters, specifically in the areas of texture mapping and video scaling. Current graphics adapters must support high performance texture mapping and video scaling to remain competitive and meet customer requirements. The present invention recognizes that aspects of these functions are very similar to aspects of the down scaling step in classic FSAA approaches. The present invention provides a mechanism for use within a data processing system 200 to provide full scene anti-aliasing (FSAA) functions without requiring specialized hardware for these functions. FSAA is used to provide improved image quality by compensating for resolution limitations in a display device. The resolution limitation causes computer generated images to be undersampled in terms of the number of pixels per unit distance required to depict the appropriate detail for an image. This undersampling effect is a form of aliasing. In particular, FSAA is accomplished using standard hardware components within graphics adapter 208.

Figure 3:
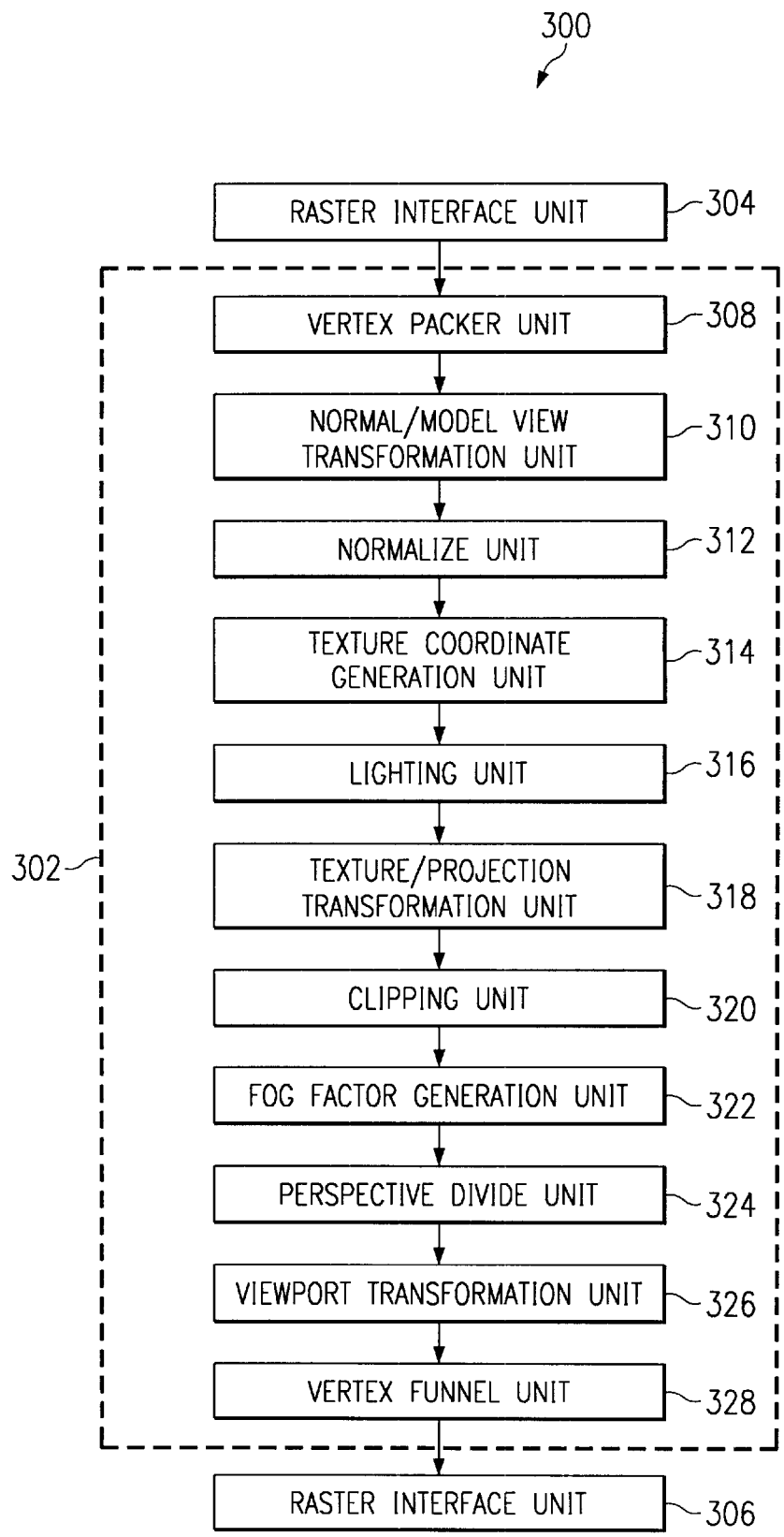
FIG. 3 is a block diagram of a geometry engine in accordance with a preferred embodiment of the present invention.

The mechanism of the present invention renders an image into an offscreen memory at a size that is larger than that of the screen window on which the image is to be displayed. The image is typically rendered a size that is two to four times that of the screen window along both the vertical and horizontal axis. Then, the image rendered into the offscreen memory is copied into a texture memory where the image is used to decal texture a polygon the size of the screen window. Decaling a texture onto a polygon surface implies that the texels fetched from texture memory are not modulated with any incoming fragment colors in any way. They are simply placed over the polygon surface without any change to their color. Texels refers to data stored as textures. Pixels is the term used to refer to data stored in the color buffers. Alternatively, video scaler logic located within the adapter may be used to scale down the image to fit on the screen window. The mechanism does not require additional hardware support for FSAA and the function may be accomplished in a single pass. In addition, today's video scaler requirements usually imply higher quality filtering than is typically found in texture engine filters. This requirement means that less information is lost when the image is downscaled to fit into the window. Turning now to FIG. 3, a block diagram of a geometry engine is depicted in accordance with a preferred embodiment of the present invention. Geometry engine 300, in this example, includes a geometry unit 302, a raster interface unit 304, and a raster interface unit 306. Data is received by raster interface unit 304 for processing within geometry unit 302. The data is received from a raster engine, such as raster engine 212 in FIG. 2. Processed data is returned to the raster engine using raster interface unit 306. The mechanism of the present invention is implemented within the processing elements in geometry unit 302.

Geometry unit 302, in this example, is a graphics pipeline containing a set of processing elements, which include a vertex packer unit 308, a normal/model view transformation unit 310, a normalize unit 312, a texture coordinate generation unit 314, a lighting unit 316, a texture/projection transformation unit 318, a clipping unit 320, a fog factor generation unit 322, a perspective divide unit 324, a viewport transformation unit 326, and a vertex funnel unit 328. These processing elements are also referred to as stages in geometry unit 302.

Vertex packer unit 308 is the top stage of a geometry unit and assembles attribute fields for a vertex. A vertex defines a point, an end point of an edge, or a corner of a polygon where two edges meet. Each vertex contains every possible fragment of data used by any stage in the geometry pipeline. These fragments are data, such as, for example, positional coordinates, colors, normals, and texture coordinates. Normal/model view transformation unit 310 is used to transform object coordinates into the world coordinate system. XYZ vertices, normals, and texture coordinates are transformed before their coordinates are used to produce an image in the frame buffer 216. This function is performed by transforming the vertices of each polygon with a single transformation matrix that is the concatenation of the individual modeling transformation matrices.

Normalize unit 312 performs normalization function of vertices that have been transformed and places each vertex back into a normal with reference to a single decimal point. In other words, the normalize unit 312 removes any skewing caused by matrix multiplication in normal/model view transformation unit 310. Texture coordinate generation unit 314 generates texture coordinates used for displaying texture for a primitive. Texture coordinate generation unit 314 calculates texture values for each texture coordinate by transforming from one coordinate system into one required for the texture coordinate. Texture coordinates associated with a vertex may either be taken from the current texture coordinates or generated according to a function dependent on vertex coordinates.

Lighting unit 316 computes shading and colors for each vertex. The lighting unit 316 applies lighting models or shading models to a vertex, which may take into account factors, such as ambient light, diffuse reflection, and specular reflection. The shading may be determined using various processes, such as constant, Gouraud, or Phong. Texture/projection transformation unit 318 changes the form or shape of a primitive. In the depicted examples, the processes of the present invention may be implemented in texture/projection transformation unit 318. The present invention, however, may be applied in a software graphics processing system as well as in a hardware system, such as the illustrated system.

Clipping unit 320 identifies a portion of a primitive lying within a clip region. A clip region is typically either a window on a screen or a view volume. Fog factor generation unit 322 is used to make an object less visible as it is further away from the viewport. Typically, mist is generated in front of the object as the object is located further and further away from the viewport.

Perspective divide unit 324 is used to generate normalized device coordinates from the incoming coordinates. This unit takes coordinates from fog factor generation unit 322 and divides them by w to generate normalized device coordinates for use by viewport transformation unit 326. Viewport transformation unit 326 takes primitives in normalized device coordinates and transforms them to window coordinates. Device coordinates are coordinates used by the adapter to display images. Normalized device coordinates are device coordinates that are normalized to between 0 and 1.

Vertex funnel unit 328 takes fragments of vertices and places them on a bus for use by the raster interface unit 304. In this example, the fragments are funneled into a 64 bit data word for transfer on the bus.

The stages illustrated in geometry unit 302 are based on operations specified in OpenGL, which is defined in The OpenGL Graphics System: A Specification (Version 1.2). The illustration and description of graphics adapter 208 in FIG. 2 and of geometry engine 300 in FIG. 3 are not meant to imply architectural limitations to the present invention and are intended as examples of hardware, which may be used with the processes of the present invention.

Figure 4:
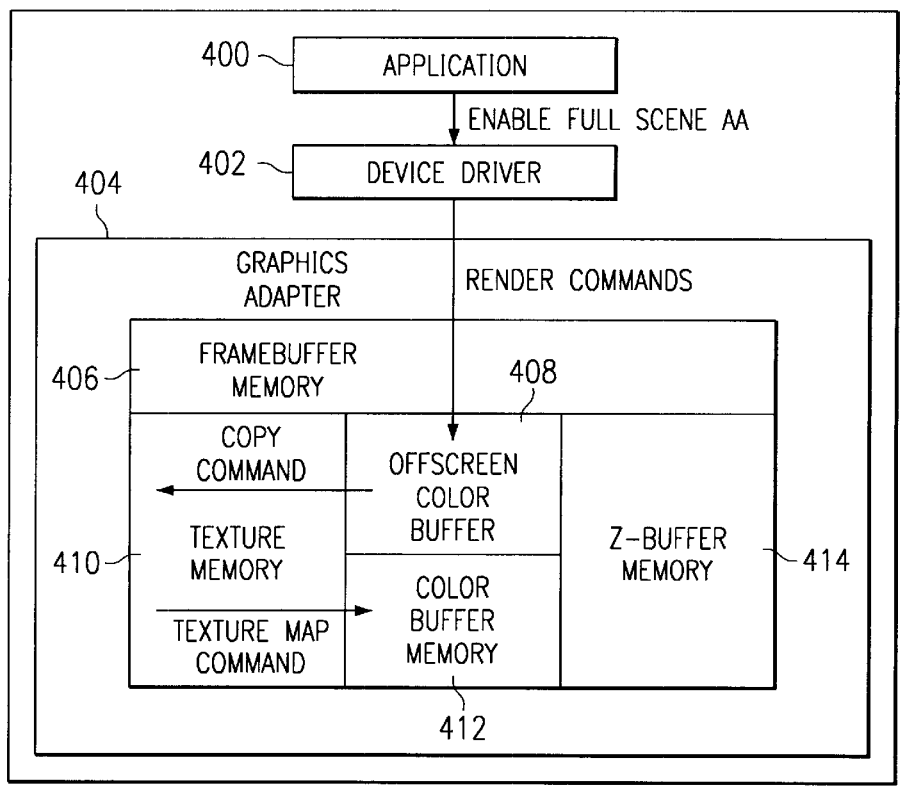
FIG. 4 is a block diagram illustrating data flow for full scene anti-aliasing (FSAA) in accordance with a preferred embodiment of the present invention.

Turning now to FIG. 4, a block diagram illustrating data flow for full scene anti-aliasing (FSAA) is depicted in accordance with a preferred embodiment of the present invention. In this example, application 400 may selectively enable full scene anti-aliasing using an application programming interface (API), such as, for example, OpenGL ARB_multisample. This example API is an OpenGL API.

The API call is received by device driver 402, which is a graphics device driver in this example. A device driver is a program routine that links a peripheral device to the operating system. A device driver is written by programmers who understand the detailed knowledge of the device's command language and characteristics and contains the precise machine language necessary to perform the functions requested by the application. In response to receiving this call, device driver 402 sends instructions to graphics adapter 404 to set up an offscreen window area, such as offscreen color buffer 408, for the geometry or image to be rendered. In this example, the offscreen window area is an offscreen color buffer located within frame buffer memory 406. This offscreen area is selected to be larger than that of the onscreen window. This onscreen window is the displayed window. Although any size offscreen area may be selected, the depicted examples use an offscreen area that is at least two times the onscreen window in width and height. Although, theoretically, any size may be selected, practically the actual size is limited by available memory in the graphics adapter.

When application 400 begins rendering an image, device driver 402 redirects the rendering of the image to offscreen color buffer 408. Additionally, device driver 402 also makes the necessary adjustments to viewing transforms to ensure that graphics primitives are rendered to the appropriate scale for the offscreen window size. Viewing transforms are commonly used by the application when setting up for rendering. In this case, the device driver is saving those application defined transforms, then setting transforms for the downscale step, then restoring the original application set transforms. This process is performed because transforms are partially selected based on the window size which is at least 4× that of the on-screen window. When application 400 finishes the rendering process, application 400 will send a command or call to device driver 402 to display the rendered image. This command or call may be made through a common API, such as glSwapBuffers or glFlush, which are APIs in OpenGL.

In response to receiving a command to display a rendered image, device driver 402 issues a set of commands to graphics adapter 404. Graphics adapter 404 in this example includes a geometry engine (not shown) and a frame buffer memory 406. A frame buffer is an area of memory used to hold a frame of data. Frame buffer memory 406, in this example, includes an offscreen color buffer 408, texture memory 410, color buffer memory 412, and Z-buffer memory 414. Graphics adapter 404 may be implemented as graphics adapter 208 in FIG. 2.

These commands cause the image data in offscreen color buffer 408 to be copied into texture memory 410. Thereafter, device driver 402 sends a texture map command to render a texture map polygon onto the screen window using the data copied into texture memory 410 from offscreen color buffer 408. The texture map polygon is rendered by placing the graphics data into color buffer memory 412. In the depicted example, the polygon fits the dimension of the screen window, which is one-half the dimensions of the offscreen window set up in offscreen color buffer 408.

The result of this process is a downscaling of the original image rendered into the offscreen window in offscreen color buffer 408. In these examples, a bi-linear filtering algorithm is applied to the image as it is downscaled by the texture mapping engine in the graphics adapter. The result is an anti-alias image, with is placed into color buffer memory 412 for display.

Figure 5:
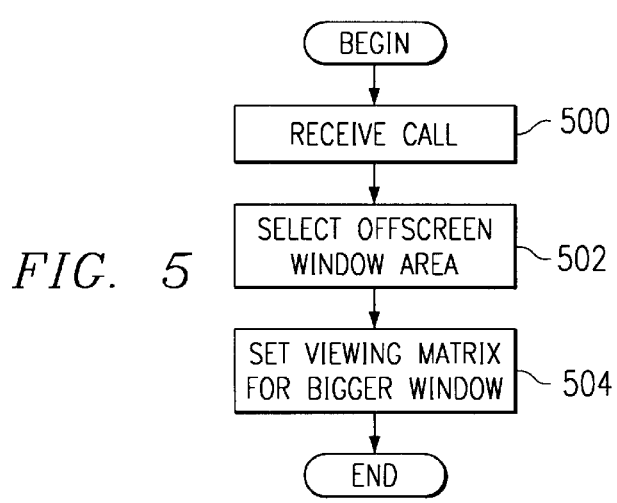
FIG. 5 is a flowchart of a process for enabling FSAA in accordance with a preferred embodiment of the present invention.

Turning next to FIG. 5, a flowchart of a process for enabling FSAA is depicted in accordance with a preferred embodiment of the present invention. This process may be implemented in a device driver, such as device driver 402 in FIG. 4. The process begins by receiving a call from the application (step 500). An offscreen window area is selected (step 502), and a viewing matrix is set for a bigger window (step 504) with the process terminating thereafter. In this manner, the FSAA function is enabled or turned "on". A similar call may be made to disable or turn "off" the FSAA function. In this example, the call may be an API call, such as OpenGL ARB_multisample. The FSAA function is not always needed by the application. It can be turned off by the application is several ways, but the OpenGL API supports a function called multisample which allows the user to Enable/Disable FSAA via the normal glEnable/glDisable sequence recognized by OpenGL drivers.

Figure 6:
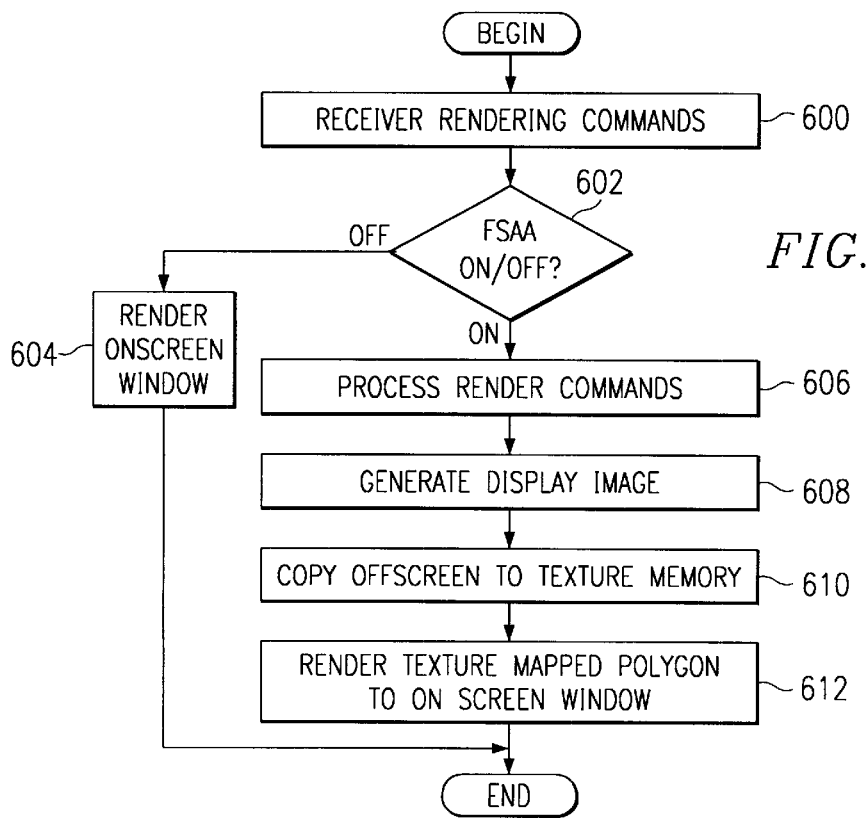
FIG. 6 is a flowchart of a process for FSAA in accordance with a preferred embodiment of the present invention.

With reference now to FIG. 6, a flowchart of a process for FSAA is depicted in accordance with a preferred embodiment of the present invention. The process is illustrated in FIG. 6 may be implemented a device driver, such as device driver 402 in FIG. 4 to provide FSAA functions.

The process begins by receiving rendering commands from the application (step 600). When a command is received, a determination is made as to whether the FSAA function has been turned on (step 602). If the FSAA function is off, the data is rendered to the onscreen window (step 604) with the process terminating thereafter. In this example, the onscreen window is located in color buffer memory 412 in FIG. 4.

On the other hand, if the FSAA function is on, the render commands for the data are processed to place the data in the offscreen window (step 606). A display image is generated (step 608). Thereafter, a command is sent to the graphics adapter to copy the image from the offscreen window into texture memory (step 610). A command is then sent to the adapter to render the texture mapped polygon to an onscreen window (step 612) with the process terminating thereafter. The loading of texture memory occurs via a simple OpenGL CopyTexImage command. This mechanism is described in the OpenGL 1.2 specification and supported by all OpenGL device drivers. Once the copy is complete the OpenGL device driver must issue a series of OpenGL commands that draw a polygon and map the loaded texture to this polygon. This command is a simple drawing primitive command executed while texture mapping is enabled.

With reference now to FIG. 7, a diagram illustrating code for an FSAA function is depicted in accordance with a preferred embodiment of the present invention. Code 700 is a code snippet demonstrating an API, which may be used to implement the processes of the present invention. Code 700 illustrates code following OpenGL for implementing the processes illustrated in FIG. 6 above.

Thus, the mechanism of the present invention provides improved image quality by compensating for resolution limitations of a display image without requiring specialized hardware to specifically perform the FSAA function. In the depicted examples, the image is rendered at four or more times the desired resolution and then scaled down to fit the original window size. By increasing the resolution by four times, the change is actually two times in each of the x and y directions, but this increases the total window area by four times. This process effectively provides oversampling relative to the original window. Texture logic functions are used in the depicted examples to accomplish the scaling.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. For example, texture logic is illustrated as the mechanism for providing the scaling in the figures. Of course, other hardware within a graphics adapter may be used. A video scaler is an example of another processing element or graphics hardware, which may be used to provide scaling for the FSAA function of the present invention. Additionally, the examples are directed towards OpenGL, but the mechanism of the present invention may be implemented using any graphics protocol. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for anti-aliasing an image, the method comprising the data processing system implemented steps of:

rendering the image to an off screen memory using a size that is larger than a desired size for the image;

resizing the image, within a hardware graphics engine in the data processing system, to the desired size; and displaying the image in the desired size.

2. The method of claim 1, wherein a texture engine within the graphics engine performs the resizing.

3. The method of claim 1, wherein a video scaler within the graphics engine performs the resizing.

4. A method in a data processing system for anti-aliasing an image, the method comprising the data processing system implemented steps of:

sending a first command to a hardware graphics engine to render the image into an off screen memory, wherein a first rendered image is formed in which the first rendered image is at least two times a desired size for the image; and sending a second command to the hardware graphics engine to resize the rendered image to the desired size to form a display image.

5. The method of claim 4, wherein the sending steps are performed by a graphics device driver.

6. The method of claim 4, wherein the sending steps are performed by an application.

7. The method of claim 4, wherein a texture engine within the graphics engine resizes the rendered image.

8. The method of claim 4, wherein a video scaler within the graphics engine resizes the rendered image.

9. The method of claim 4 further comprising:

displaying the display image on a display device.

10. The method of claim 4 further comprising:

setting a viewing area within the off screen memory for rendering the image.

11. The method of claim 4, wherein the second command copies the rendered image from the off screen memory to a texture memory.

12. A data processing system comprising:

a bus system;

a memory connected to the bus containing a set of processor executable instructions;

a graphics adapter connected to the bus, wherein the graphics adapter includes an output configured for connection to a display device;

a processor unit connected to the bus, wherein the processor unit executes the set of processor executable instructions to send a first command to the graphics adapter to render the image into an off screen memory in which a first rendered image is formed such that the first rendered image is at least two times a desired size for the image and to send a second command to the graphics adapter to resize the rendered image to the desired size to form a display image.

13. The data processing system of claim 12, wherein the bus system comprises a single bus.

14. The data processing system of claim 12, wherein the bus system includes a set of buses interconnected by bridges.

15. The data processing system of claim 12, wherein the processor unit is single processor and a set of processors.

16. A data processing system for anti-aliasing an image, the data processing system comprising:

rendering means for rendering the image to an off screen memory using a size that is larger than a desired size for the image;

resizing means for resizing the image, within a hardware graphics engine in the data processing system, to the desired size; and displaying means for displaying the image in the desired size.

17. The data processing system of claim 16, wherein a texture engine within the graphics engine includes the resizing means.

18. The data processing system of claim 16, wherein a video scaler within the graphics engine includes the resizing means.

19. A data processing system for anti-aliasing an image, the data processing system comprising:

first sending means for sending a first command to a hardware graphics engine to render the image into an off screen memory, wherein a first rendered image is formed in which the first rendered image is at least two times a desired size for the image; and second sending means for sending a second command to the hardware graphics engine to resize the rendered image to the desired size to form a display image.

20. The data processing system of claim 19, wherein the first sending means and the second sending means are located in a graphics device driver.

21. The data processing system of claim 19, wherein the first sending means and the second sending means are located in an application.

22. The data processing system of claim 19, wherein a texture engine within the graphics engine resizes the rendered image.

23. The data processing system of claim 19, wherein a video scaler within the graphics engine includes the resizing means to resize the rendered image.

24. The data processing system of claim 19 further comprising:

displaying means for displaying the display image on a display device.

25. The data processing system of claim 19 further comprising:

setting means for setting a viewing area within the off screen memory for rendering the image.

26. The data processing system of claim 19, wherein the second command copies the rendered image from the off screen memory to a texture memory.

27. A computer program product in a computer readable medium for use in a data processing system for anti-aliasing an image, the computer program product comprising:

first instructions for rendering the image to an off screen memory using a size that is larger than a desired size for the image;

second instructions for resizing the image, within a hardware graphics engine in the data processing system, to the desired size; and third instructions for displaying the image in the desired size.

28. A computer program product in a computer readable medium for use in a data processing system for anti-aliasing an image, the computer program product comprising:

first instructions for sending a first command to a hardware graphics engine to render the image into an off screen memory, wherein a first rendered image is formed in which the first rendered image is at least two times a desired size for the image; and second instructions for sending a second command to the hardware graphics engine to resize the rendered image to the desired size to form a display image.

* * * * *